United States Patent
Meggiolan

(10) Patent No.: US 9,862,450 B2
(45) Date of Patent: Jan. 9, 2018

(54) BICYCLE HANDLEBAR ASSEMBLY

(71) Applicant: Campagnolo S.r.l., Vicenza (IT)

(72) Inventor: Mario Meggiolan, Creazzo (IT)

(73) Assignee: CAMPAGNOLO S.R.L., Vicenza (IT)

( * ) Notice: Subject to any disclaimer, the term of this patent is extended or adjusted under 35 U.S.C. 154(b) by 213 days.

(21) Appl. No.: 14/068,540

(22) Filed: Oct. 31, 2013

(65) Prior Publication Data

US 2014/0137698 A1 May 22, 2014

(30) Foreign Application Priority Data

Oct. 31, 2012 (IT) .............................. MI2012A1873

(51) Int. Cl.
| | |
|---|---|
| *B62K 21/12* | (2006.01) |
| *B62K 21/18* | (2006.01) |
| *B62K 19/16* | (2006.01) |

(52) U.S. Cl.
CPC .............. *B62K 21/12* (2013.01); *B62K 19/16* (2013.01); *B62K 21/18* (2013.01); *Y10T 74/2078* (2015.01)

(58) Field of Classification Search
CPC .... Y10T 74/2078; B62K 19/16; B62K 21/12; B62K 21/18; B62K 21/26
(Continued)

(56) References Cited

U.S. PATENT DOCUMENTS 4,323,263 A * 4/1982 Cook ..................... B62K 21/18
280/279
5,685,553 A * 11/1997 Wilcox .................... B62K 3/10
280/281.1
(Continued)

FOREIGN PATENT DOCUMENTS

| | | |
|---|---|---|
| CN | 1376613 A | 10/2002 |
| CN | 2889872 Y | 4/2007 |

(Continued)

OTHER PUBLICATIONS

JPO Machine Translation of JP 3148216, Martinez, Jan. 2009.*
(Continued)

*Primary Examiner* — Vinh Luong
(74) *Attorney, Agent, or Firm* — Volpe and Koenig, P.C.

(57) ABSTRACT

A bicycle handlebar assembly having a handlebar attachment mounted fixedly connected to a fork of the bicycle and oriented forwards with respect to it, elongated mainly according to its own longitudinal axis (B) inclined with respect to the direction of forward movement (A) of the bicycle by an angle a smaller than +/−12°; a handlebar rod, provided with handgrips at opposite ends thereof; a front seat) formed in the handlebar attachment for abutment of a central area of the handlebar rod; a stop removably fixed to said handlebar attachment through attachment screws to lock the handlebar rod in the seat of the handlebar attachment. The stop comprises at least one open strap, with a central portion arranged in circumferential direction around the handlebar rod and two rear arms extending in tangential direction with respect to the central portion for fixing to the handlebar attachment by means of the attachment screws.

The rear attachment arms of the strap extending in the tangential direction thus face backwards with respect to the direction of forward movement (A) of the bicycle and thus allow the front section of the handlebar assembly to be reduced.

16 Claims, 4 Drawing Sheets

(58) Field of Classification Search
USPC ............. 74/551.1; D12/118; 280/279, 281.1; 403/290
See application file for complete search history.

(56) References Cited

U.S. PATENT DOCUMENTS

| | | | | |
|---|---|---|---|---|
| 7,131,350 | B2 * | 11/2006 | McColligan | B62K 21/12 403/290 |
| 8,020,884 | B1 * | 9/2011 | Foley | B62K 21/12 280/279 |
| D688,167 | S * | 8/2013 | Klieber | D12/118 |
| 2002/0139220 | A1 | 10/2002 | Irie | |
| 2002/0148323 | A1 * | 10/2002 | Thomson | B62K 19/36 74/551.1 |
| 2005/0248120 | A1 * | 11/2005 | McJunkin | B62K 21/12 280/279 |
| 2006/0162482 | A1 | 7/2006 | Okajima et al. | |
| 2009/0078076 | A1 | 3/2009 | Chen | |
| 2010/0275723 | A1 | 11/2010 | Servet | |
| 2012/0255391 | A1 * | 10/2012 | Gueugneaud | B62K 21/12 74/551.1 |
| 2014/0373670 | A1 * | 12/2014 | Huang | B62K 21/12 74/551.1 |
| 2015/0225035 | A1 * | 8/2015 | Li | B62K 21/12 74/551.8 |
| 2015/0291247 | A1 * | 10/2015 | Fukao | B62K 23/06 74/473.14 |

FOREIGN PATENT DOCUMENTS

| | | | |
|---|---|---|---|
| CN | 201400270 Y | 2/2010 | |
| CN | 101875383 A | 11/2010 | |
| EP | 2703274 B1 * | 1/2015 | ............. B62K 21/12 |
| FR | 974677 A | 2/1951 | |
| JP | 2005349896 A | 12/2005 | |
| JP | 2006193142 A2 | 7/2006 | |
| JP | 3148216 U * | 1/2009 | ............. B62K 21/12 |
| WO | WO 2010/018471 A1 * | 2/2010 | ............. B62K 21/12 |

OTHER PUBLICATIONS

EPO Machine Translation of CN2889872Y, Ricky, Apr. 18, 2007.*
European Search Report for Italian Patent Application No. MI2012A001873, dated Feb. 26, 2013, with English translation.
Japanese Office Action for Application No. 2013-224981, dated Apr. 25, 2017, English translation.
Chinese Office Action for Chinese Application No. 201310530717. 2, dated May 3, 2017, English translation.
Chinese Office Action for Application No. 201310530717.2, dated Aug. 3, 2016, with English translation.

* cited by examiner

US 9,862,450 B2

BICYCLE HANDLEBAR ASSEMBLY

FIELD OF INVENTION

The present invention refers to a bicycle handlebar assembly, as well as to an attachment stop for a bicycle handlebar assembly.

BACKGROUND

It is known that a bicycle handlebar assembly normally comprises a handlebar attachment (also called stem), a handlebar rod and an attachment stop, which fasten together the handlebar rod with the handlebar attachment.

The handlebar attachment is mounted on the top of the fork, fixedly connected to it, and faces forwards, horizontal in the direction of forward movement of the bicycle or almost horizontal, in a direction tilted upwards or downwards by a few degrees with respect to the direction of forward movement of the bicycle.

In the field of racing bicycles, there is also a well-known need to reduce the weight of each component, both by using light materials (such as light metals and composite materials) and by taking great care in sizing each detail, so as to reduce the thicknesses and sizes whilst still ensuring the necessary mechanical strength.

Moreover, particularly for bicycles intended for races, there is an ever-increasing need for careful aerodynamic profiling, particularly of the bicycle-cyclist assembly, so as to reduce the resistance offered by air during high-speed travel. A great deal of attention has therefore been placed on the wheels (with the development of lenticular wheels) and on the cyclist's clothing. Moreover, more recently particular attention has been given to the components that determine or in any case influence the position taken up by the cyclist's body, like the position and shape of the saddle, of the handgrips on the handlebars and of the gear and brake levers. On the other hand, no great attention has yet been paid to the aerodynamic characteristics of each component of the bicycle. In particular, handlebar assemblies have not yet been the subject of much attention in terms of aerodynamics, apart from—as stated—in relation to the position of the cyclist.

SUMMARY

The bicycle handlebar assembly includes a handlebar attachment that is fixedly connected to a fork of the bicycle and oriented forwards with respect to the direction of forward movement of the bicycle by an angle ($\alpha$) that is no greater than +/−12°. A handlebar rod is provided with handgrips at opposite ends thereof, and a front seat is formed in the handlebar attachment for abutment with a central area of the handlebar rod. A stop is fixed to the handlebar with screws that lock the handlebar rod in the seat of the handlebar attachment.

BRIEF DESCRIPTION OF THE DRAWING(S)

Further characteristics and advantages of a handlebar assembly and of an attachment stop according to the invention will become clearer from the following description of a preferred embodiment of the invention, made with reference to the attached drawings. In such drawings.

INTRODUCTION OF THE PREFERRED EMBODIMENTS

Figure 1:
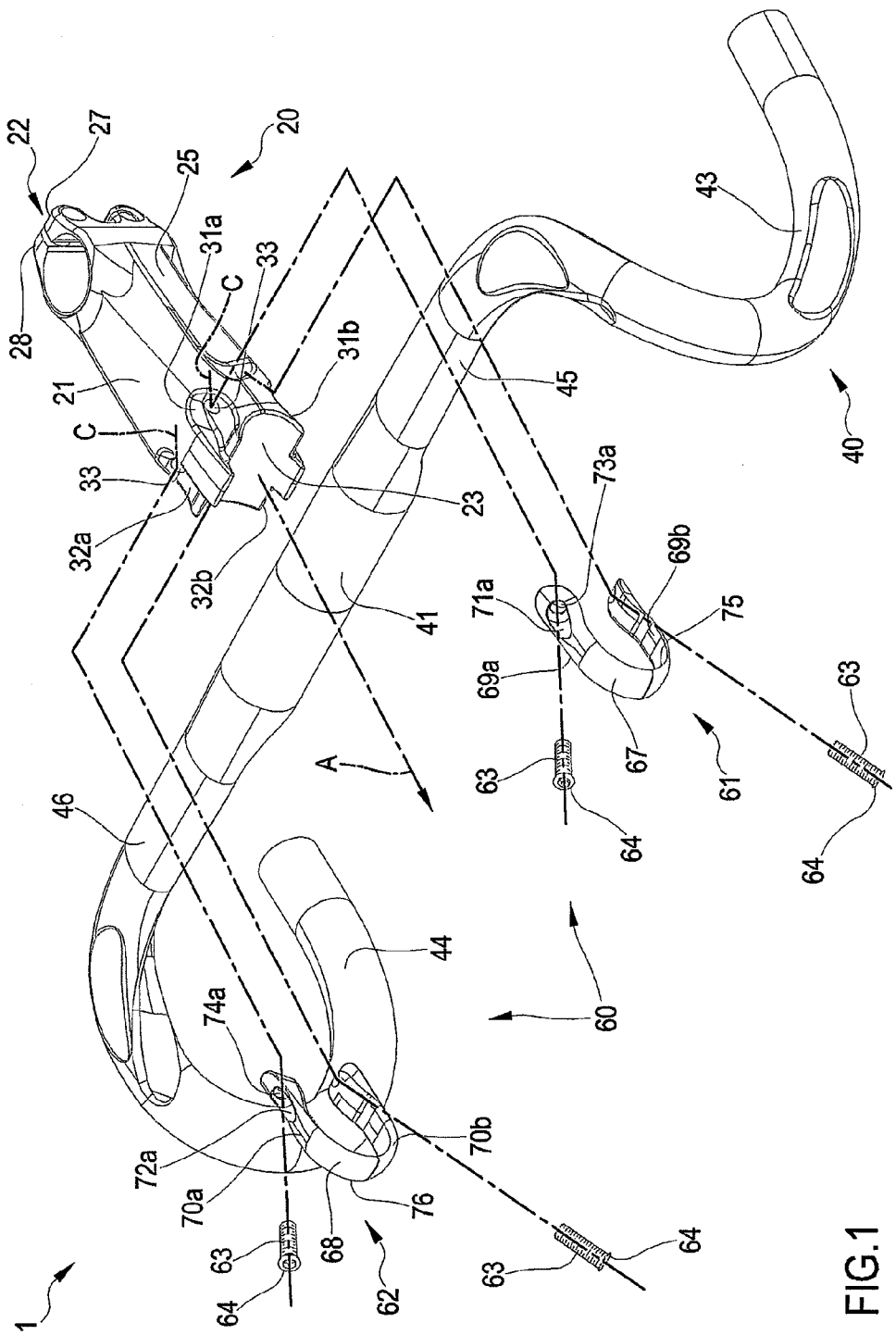
FIG. 1 is an exploded perspective view of a handlebar assembly according to the invention.
Figure 2:
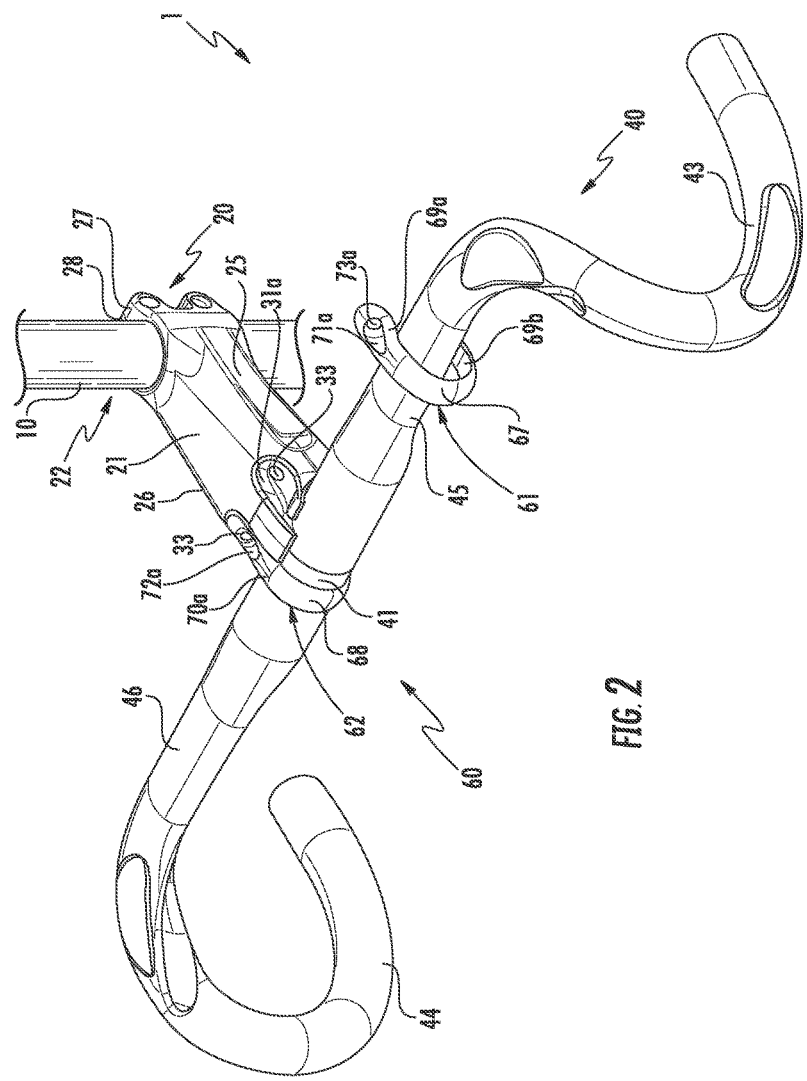
FIG. 2 is a perspective view of the handlebar assembly of FIG. 1, in a step of its assembly, in which one strap is in its final position whereas another strap is inserted onto an area of the handlebar rod, ready to be taken into its final position.

The purpose of the present invention is to provide a handlebar assembly the aerodynamics of which are particularly improved.

Therefore, the present invention in a first aspect thereof concerns a handlebar assembly according to claim 1 and in a second aspect thereof concerns an attachment stop for a handlebar assembly according to claim 14. Preferred characteristics are given in the dependent claims.

In particular, a bicycle handlebar assembly according to the first aspect of the invention comprises: a handlebar attachment mounted fixedly connected to a fork of the bicycle and oriented forwards with respect to it, elongated mainly according to its own longitudinal axis inclined with respect to the direction of forward movement of the bicycle by an angle smaller than +/−12°; a handlebar rod, provided with handgrips at opposite ends thereof; a front seat formed in the handlebar attachment for abutment of a central area of the handlebar rod; a stop removably fixed to said handlebar attachment through attachment screws to lock the handlebar rod in the seat of the handlebar attachment. The stop comprises at least one open strap, with a central portion arranged in circumferential direction around the handlebar rod and two rear arms extending in tangential direction with respect to the central portion for fixing to the handlebar attachment by means of the attachment screws.

Providing that the rear attachment arms of the strap extend in the tangential direction, thus facing backwards with respect to the direction of forward movement of the bicycle, makes it possible to reduce the front section of the handlebar assembly, without changing other characteristics; in known handlebar assemblies, on the contrary, parts that protrude radially from the handlebar rod are normally provided for such attachment.

Preferably, the central portion of the strap is arranged circumferentially around the handlebar rod for a contact angle comprised between 170° and 225°, more preferably comprised between 170° and 190°, even more preferably about 182°. In this way, the central portion of the strap extends not only in front of but also behind the handlebar rod, although by a minimal extent, contributing to the aforementioned reduction in front section: the rear arms, indeed, already extend from a recessed position with respect to the shape of the central portion.

Preferably, the two rear arms of the strap are provided with respective holes for the attachment screws, the holes being formed in respective seats for recessed housing of heads of the screws. The recessed position of the heads of the attachment screws of the strap to the handlebar attachment contributes to improving the aerodynamics of the handlebar assembly.

Preferably, the assembly comprises seats formed in the handlebar attachment for recessed housing of the rear arms of the strap. The recessed position of the rear arms of the strap also contributes to improving the aerodynamics of the handlebar assembly.

In a particularly preferred embodiment, the two arms of the strap are provided with respective holes for the attachment screws, the holes are formed in respective seats for recessed housing of heads of the screws, and the handlebar attachment is provided with seats for recessed housing of the rear arms of the strap, and the contact angle and the depth of the recessed seats are such that neither the heads of the attachment screws nor the rear arms project from the outline shape of the strap seen from the front according to the longitudinal axis of the handlebar attachment. In this way, the front section is reduced to the minimum, being determined only by the central portion of the strap, the size of which is determined by the diameter of the handlebar rod.

Preferably, the handlebar rod comprises non-central areas having a section with minimum diameter, smaller than the diameter of the central area of the handlebar rod, in which the ends of the rear arms of the strap are separated by a distance of no less than the minimum diameter and less than the diameter of the central area of the handlebar rod. Such a handlebar rod, with greater diameter at the central area, allows sizing that takes into account the need for greater mechanical strength in the central area, which undergoes greater stress due to the greater lever arms with respect to the handgrips on which the cyclist exerts the force. Moreover, in this way it is possible to make the strap as a rigid part, so that it can be inserted onto the handlebar rod where it has minimum diameter and then moved into the central area where attachment takes place. Otherwise, in order to be able to be inserted onto the handlebar rod, the strap should be made as an elastically deformable part; this is certainly possible, but not preferred, because it imposes the choice of a suitable material, like for example spring steel, which is much heavier than the materials usually used in racing bicycles (aluminium, composite materials).

Preferably, each of the screws is arranged according to an axis that is inclined with respect to the longitudinal axis of the handlebar attachment. This inclination makes it possible both to reduce the bulk of the heads of the screws with respect to the outline shape of the strap seen from the front according to the longitudinal axis of the handlebar attachment, and to improve the mechanical thrusting capability of the screws on the handlebar rod against the handlebar attachment.

If suitably sized, a single strap can be sufficient as stop for a handlebar assembly. Preferably, however, said at least one strap comprises a pair of straps, symmetrically identical and symmetrically arranged with respect to the middle line of the handlebar rod. It is thus possible to have a better distribution of the stresses over a wider area of the handlebar rod and of the handlebar attachment; it is thus possible to obtain the same firm attachment using two relatively thin straps instead of a single thicker one, and this gives an advantage—albeit small—in terms of aerodynamics, due to the reduced protrusion with respect to the handlebar rod. Moreover, it is easier to mount the two straps correctly.

If a pair of straps is provided, preferably at least the central portion thereof has tapered cross section, with a thickness that reduces towards one side of the strap, facing the opposite way with respect to the middle line of the handlebar rod, and thus opposite to the other strap. This external tapering makes the assembly of the two straps on the handlebar rod more aerodynamic; moreover, it reduces protrusions that could potentially be dangerous to the cyclist.

If a pair of straps is provided, preferably the seats formed in the handlebar attachment are open on one side of the handlebar attachment. In this way it is possible to position each strap with its rear arms in the respective seats formed in the handlebar attachment without any deformation (splaying) of the strap being necessary; the strap is thus prevented from weakening during mounting.

The various parts of the handlebar assembly can be made from various materials. Preferably, the handlebar attachment is made from composite material and the strap is made from metal, preferably aluminium, and metal bushes are provided incorporated in the handlebar attachment for the coupling of the attachment screws of the strap with the handlebar attachment. The composite material is indeed suitable for making closed shapes like the handlebar attachment or tubular ones like the handlebar rod, whereas for the open shape of the straps metal is preferable, which can more easily ensure the necessary solidity; among metals, aluminium is preferred due to its lightness. The metal bushes incorporated in the composite material of the handlebar attachment ensure a secure and stable coupling of the attachment screws.

An attachment stop for attaching a handlebar rod to a handlebar attachment for a bicycle handlebar assembly, according to the second aspect of the invention, comprises at least one open strap, with a central portion intended to be arranged in circumferential direction around the handlebar rod and two rear arms extending in tangential direction with respect to the central portion, for attachment to the handlebar attachment.

As stated with reference to the first aspect of the invention, the rear attachment arms of the strap extending in the tangential direction, thus facing back with respect to the direction of forward movement of the bicycle, allow the front section of the handlebar assembly in which the stop is used to be reduced, without changing the other characteristics.

Preferably, at least the central portion of the strap has a tapered cross section, with thickness that reduces towards a side of the strap. Thus, when a pair of straps is provided, this tapering (facing towards the outside of the pair of straps) makes the assembly of the two straps on the handlebar rod more aerodynamic; moreover, it reduces protrusions that are potentially dangerous to the cyclist.

Preferably, the ends of the rear arms of the strap are separated by a distance smaller than the internal diameter of the central portion, i.e. they are closed towards one another, so as to reduce the overall bulk around the handlebar rod. If such a strap is rigid, it can be used in a handlebar assembly in which the handlebar rod comprises portions of reduced section, such as to allow the insertion of the strap. Otherwise, it can be elastically deformable, so as to also be able to be inserted around a portion of handlebar rod having an external diameter equal to the internal diameter of the central area of the strap.

DETAILED DESCRIPTION OF THE PREFERRED EMBODIMENTS

In the figures, reference numeral 1 indicates a handlebar assembly for a bicycle, in particular a racing bicycle suitable for speed competitions. The handlebar assembly 1 comprises a handlebar attachment 20, a handlebar rod 40 and a stop 60. With reference to the bicycle, albeit not illustrated, a direction A of forward movement of the bicycle during normal forward travel is also defined in the handlebar assembly 1; hereafter, each reference such as "forwards", "front", "backwards", "back", "longitudinal", "left", "right" and the like should be taken with reference to the direction A, unless a difference reference is expressly indicated. In the figures, the direction A is shown in a vertical plane that is a middle plane of the bicycle, of the handlebar attachment 20 and of the handlebar rod 40.

The handlebar attachment 20 comprises a substantially tubular body 21, extending between a rear clamp 22 for locking on the top of a bicycle fork 10 and a front seat 23 for coupling with the handlebar rod 40, between a left side 25 and a right side 26. The body 21 is elongated mainly according to its own longitudinal axis B inclined with respect to the direction A by an angle α; the angle α, which in the illustrated example is equal to about 8° downwards, can in general be comprised between +12° and −12°, where the +sign indicates a downward angle whereas the −sign indicates an upward angle. The rear clamp 22 is of the per séknown type, with two opposite jaws 27 and 28, able to be clamped together around a stem of a fork 10 by means of screws (not shown), so as to ensure that the handlebar attachment 20 rotates as a unit with the fork 10. The front seat 23 has a convex shape, corresponding to the convex shape of the handlebar rod 40, as will be illustrated more clearly later on.

The handlebar rod 40 shown is a tubular bar with curved ends (but in general it can also be straight or of any other type), with a central area 41 and handgrips 43, 44 at the opposite ends. The figures do not show the controls (for brakes and gearshifts), typically mounted on the handlebar rod, not part of the present invention. Between the central area 41 and the handgrips 43, 44 there are intermediate (or non-central) areas 45, 46 of the handlebar rod 40, which have a section with minimum diameter, smaller than the section of the central area 41.

In the assembled handlebar assembly 1, the central area 41 is received by the front seat 23, resting on it. The concave shape of the seat 23 and the convex external shape of the central area 41 of the handlebar rod 40 preferably correspond to one another, so as to fit together and thus transmit the stresses more evenly and uniformly. Preferably, like in the illustrated handlebar assembly 1, both the central area 41 and the seat 23 are cylindrical; the cylindrical shape is preferred due to its simpler construction, both on the concave seat 23 and on the convex central area 41. However, it is also possible to provide different shapes, for example tubular shapes with non-circular section squashed in the vertical direction (for example elliptical section); such shapes will be more complex to make (particularly it will be more complex to ensure the coupling over the entire extension of the seat 23), but they could be preferred due to their better aerodynamics.

The handlebar rod 40 is then fixed to the handlebar attachment 20 by means of the stop 60, which comprises two left and right open straps 61 and 62, and for each of these straps 61 and 62 a pair of respective attachment screws, all indicated with 63. The screws 63 have a shaped head 64, so as to minimise bulk.

The left strap 61 comprises a central portion 67, having a partially annular shape extending for a contact angle β comprised between 170° and 225° (preferably between 170° and 190°, more preferably about 182°), and two rear arms 69a and 69b, extending in tangential direction with respect to the central portion 67. The rear arms 69a, 69b are provided at their ends with respective recessed seats 71a, 71b, in which through holes 73a, 73b are formed for the attachment of the strap 61 to the handlebar attachment 20 by means of the screws 63.

The central portion 67 of the strap 61 has a tapered cross section, with thickness that reduces towards an external side 75 of the strap 61, which faces the opposite way with respect to the other strap 62, i.e. the opposite way with respect to the middle line of the handlebar rod 40 or the axis B of the handlebar attachment 20, or also with respect to the direction A as shown in the figures.

The rear arms 69a and 69b have an increasing cross section going from the central portion 67 up to the ends of the rear arms 69a, 69b with the seats 71a and 71b; these ends are separated by a distance d of no less than the minimum diameter of the intermediate area 45 of the handlebar rod 40, but less than the internal diameter of the central portion 67 of the strap 61.

Like the left strap 61, the right strap 62 comprises a central portion 68, having a partially annular shape extending for a contact angle β comprised between 170° and 225° (preferably between 170° and 190°, more preferably about 182°), and two rear arms 70a and 70b, extending in tangential direction with respect to the central portion 68. The rear arms 70a, 70b are provided at their ends with respective recessed seats 72a, 72b, in which through holes 74a, 74b are formed for the attachment of the strap 62 to the handlebar attachment 20 by means of the screws 63.

The central portion 68 of the strap 62 has a tapered cross section, with a thickness that reduces towards an external side 76 of the strap 62, which faces the opposite way with respect to the other strap 61, i.e. the opposite way with respect to the middle line of the handlebar rod 40 or the axis B of the handlebar attachment 20, or even with respect to the direction A as shown in the figures.

The rear arms 70a and 70b have an increasing cross section going from the central portion 68 up to the ends of the rear arms 70a, 70b with the seats 72a and 72b; these ends are separated by a distance d of no less than the minimum diameter of the intermediate area 46 of the handlebar rod 40, but less than the internal diameter of the central portion 68 of the strap 62.

Preferably, the two straps 61 and 62 are symmetrically identical and symmetrically arranged with respect to the middle line of the handlebar rod or the axis B of the handlebar attachment 20. Preferably, in each of them the two rear arms 69a, 69b and 70a, 70b are also symmetrically identical and symmetrically arranged with respect to the respective central portions 67 and 68. Preferably, therefore, like in the illustrated handlebar assembly 1, the two straps 61 and 62 are identical to one another: the rear arm 69a is identical to the rear arm 70b, whereas the rear arm 69b is identical to the rear arm 70a; therefore, the same strap can be used as left strap 61 or as right strap 62, by simply flipping it by 180°.

The handlebar attachment 20 comprises two pairs of seats 31a, 31b and 32a, 32b, formed near to the concave front seat 23, for the recessed housing of the ends of the rear arms 69a, 69b and 70a, 70b, respectively. More specifically, the seats are formed behind the front seat 23, open at the side and towards the top or bottom: the seat 31a is open towards the top and towards the left side 25, the seat 31b is open towards the bottom and towards the left side 25, the seat 32a is open towards the top and towards the right side 26, the seat 32b is open towards the bottom and towards the right side 26. In the seats 31a, 31b and 32a, 32b, on the bottom thereof, there are respective threaded holes, all indicated with 33, for engagement with the attachment screws 63; preferably, each hole 33 is formed in a respective bush 34, incorporated in the handlebar attachment 20.

The seats 31a, 31b and 32a, 32b are configured correspondingly to the shape of the ends of the arms, respectively, so as to allow the arms 69a, 69b and 70a, 70b to be recessed in the handlebar attachment 20, in the assembled handlebar assembly 1.

The holes 33 and the screws 63 that engage therein are arranged according to axes C, inclined with respect to the axis B by identical angles +/−γ, upwards or downwards.

Preferably, the handlebar attachment 20 and the handlebar rod 40 are made from composite material, for example with a resin that incorporates carbon fibres or similar. Preferably, the straps 61 and 62 are made from metal, preferably aluminium. Preferably, the screws 63 and the bushes 34 are made from metal, preferably steel.

For the (removable) assembly of the handlebar assembly 1, the straps 61 and 62 are first inserted onto the intermediate areas, where the minimum diameter allows the two ends of the rear arms 69a, 69b or 70a, 70b to pass without it being necessary to splay apart the strap. Thereafter, the straps 61 and 62 are made to translate towards the middle line of the handlebar rod 40 while the latter is brought against the front seat 23 of the handlebar attachment 20. The rear arm 69a is inserted into the seat 31 a, the rear arm 69b is inserted into the seat 31b, the rear arm 70a is inserted into the seat 32a and the rear arm 70b is inserted into the seat 32b; these insertions are possible without having to splay apart the straps 61 and 62, because the seats 31a, 31b and 32a, 32b are laterally open, on the sides 25 and 26 of the handlebar attachment 20. Once the straps 61 and 62 have been positioned, the screws 63 are inserted into the holes 73a, 73b and 74a, 74b and screwed into the holes 33, in this way tightening the straps 61, 62 around the handlebar rod 40, against the handlebar attachment 20. In the end, the handlebar rod 40 is in tight contact for the contact angle β with the central portions 67 and 68 of the two straps 61 and 62, and for the rest with the front seat 23 of the handlebar attachment 20.

Figure 3:
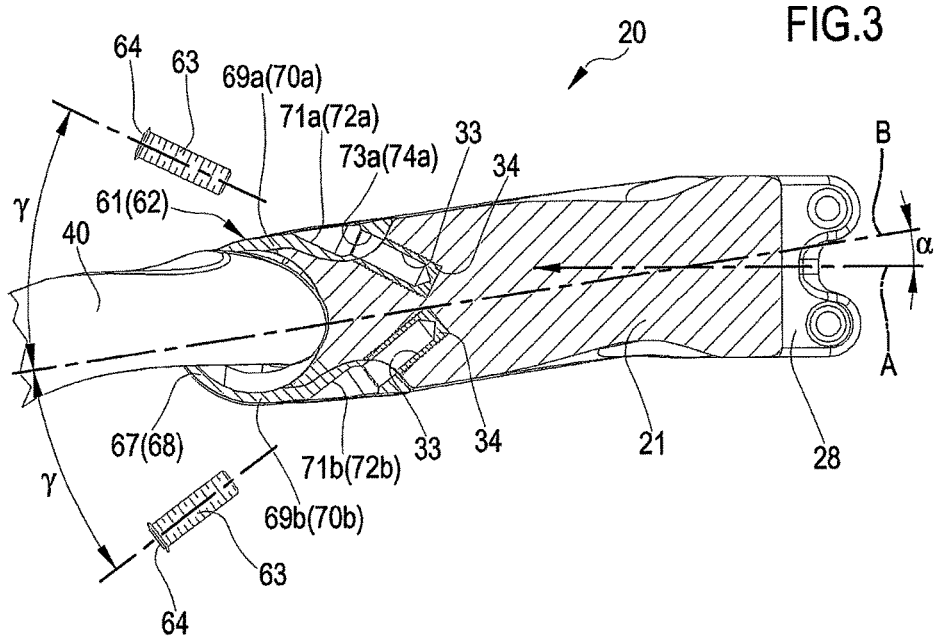
FIG. 3 is a section view of the handlebar assembly of FIG. 1, according to a longitudinal section plane through a strap, with the attachment screws not yet inserted into the respective seats and holes.
Figure 4:
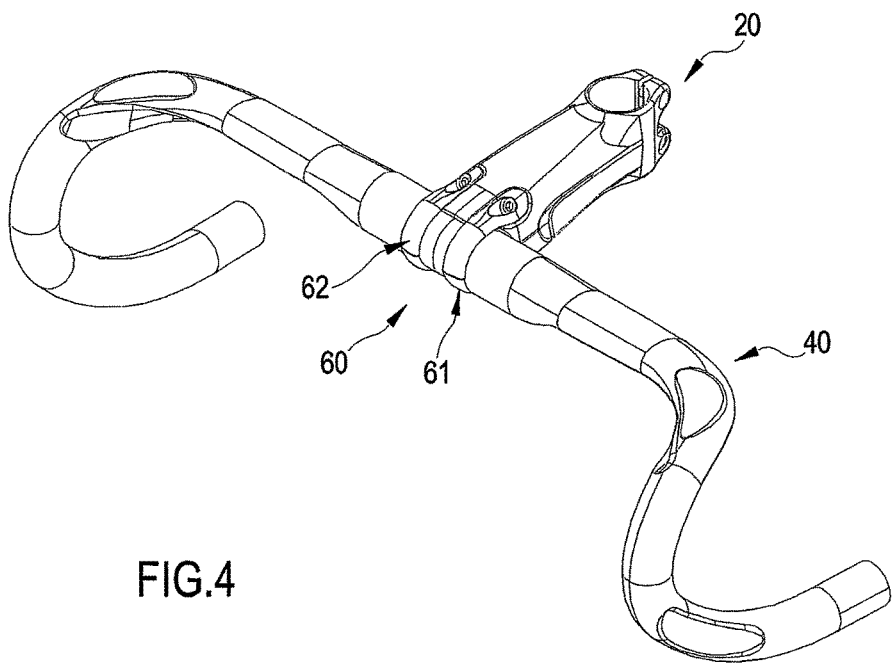
FIG. 4 is a perspective view of the handlebar assembly of FIG. 1, completely assembled.
Figures 5, 6:
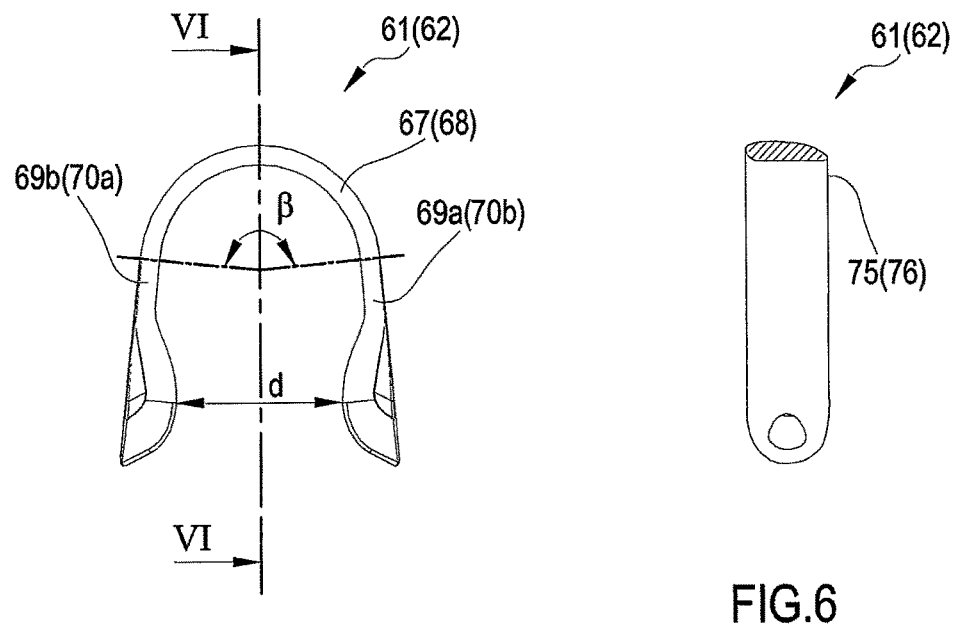
FIG. 5 is a view of one of the straps of the assembly of FIG. 1.
FIG. 6 is a section view of the strap of FIG. 5, according to the plane VI-VI.
Figure 7:
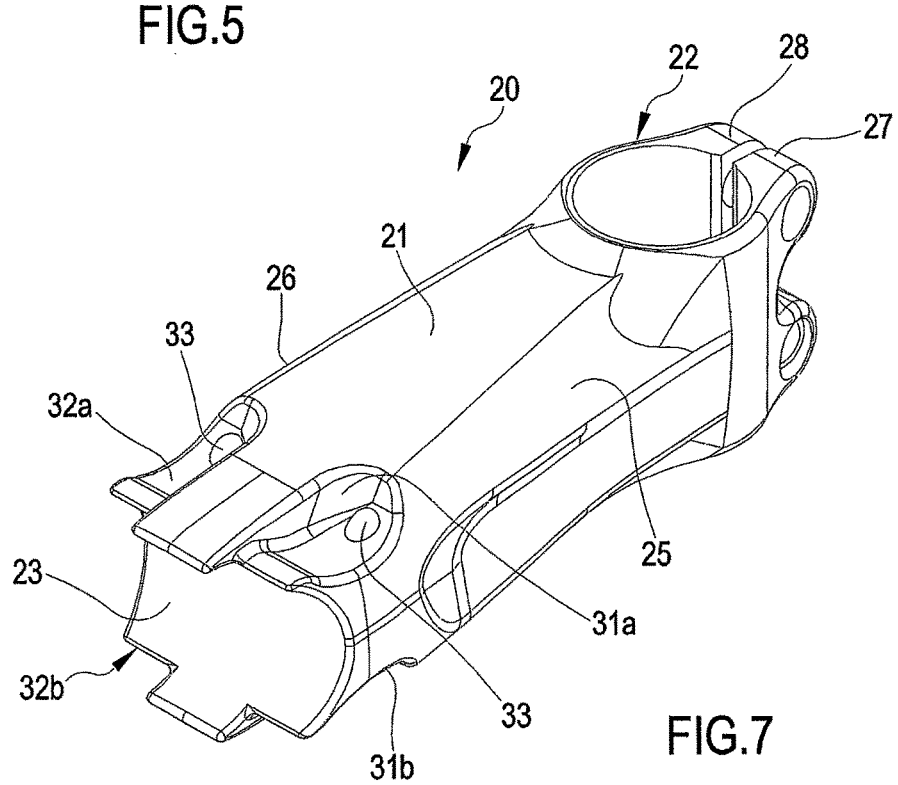
FIG. 7 is a perspective view of the handlebar attachment of the handlebar assembly of FIG. 1.

Once assembly is complete, as can clearly be seen particularly in FIGS. 3 and 4, thanks to the extension in the tangential direction of the rear arms 69a, 69b and 70a, 70b, to the depth and to the recessed shape of the seats 71a, 71b, 72a, 72b and 31a, 31b, 32a, 32b, to the size of the contact angle β, the straps 61 and 62 and the heads 64 of the screws 63 do not protrude from the outline shape of the straps seen from the front according to the longitudinal axis B of the handlebar attachment.

Therefore, the aerodynamic resistance offered by the handlebar assembly 1 at high speeds is substantially less than that of an analogous handlebar assembly made according to the prior art. Moreover, the handlebar assembly 1 can be particularly light, thanks to the use of light materials and to the accurate sizing of the parts. At the same time, the necessary solidity of the handlebar assembly 1 is ensured.

What is claimed is:

1. A bicycle handlebar assembly, comprising an elongated handlebar attachment mounted fixedly connected to a fork of a bicycle and oriented forwards with respect to the fork, a handlebar rod provided with handgrips at opposite ends thereof, a front seat formed in the handlebar attachment for abutment of a central area of the handlebar rod, a stop removably fixed to said handlebar attachment through attachment screws to lock the handlebar rod in the seat of the handlebar attachment; wherein the stop comprises at least one open strap including a central portion arranged in a circumferential direction around the handlebar rod and two rear arms that extend tangentially from the central portion and toward each other for fixing to the handlebar attachment by the attachment screws, each rear arm including recesses that are of sufficient depth to receive the attachment screws within a respective recess, and the handlebar attachment includes seats for recessed housing of the recesses of the rear arms within the handlebar attachment, such that the at least one strap and heads of the attachment screws within said at least one strap do not protrude from an outline shape of the at least one strap as seen from a front of the bicycle according to a longitudinal axis of the handlebar attachment.

2. The assembly according to claim 1, wherein the central portion of the strap is arranged circumferentially around the handlebar rod for a contact angle (β) comprised between 170° and 225°.

3. The assembly according to claim 2, the contact angle (β) and the recesses of the rear arms are dimensioned such that both the screws and the rear arms are within an outline shape of the strap seen from the front according to the longitudinal axis of the handlebar attachment.

4. The assembly according to claim 1, wherein the handlebar rod comprises non-central areas having a section with minimum diameter, smaller than the diameter of the central area of the handlebar rod, wherein the ends of the rear arms of the strap are separated by a distance of no less than the minimum diameter and less than the diameter of the central area of the handlebar rod.

5. The assembly according to claim 1, wherein each of the screws is arranged according to an axis inclined with respect to the longitudinal axis of the handlebar attachment.

6. The assembly according to claim 1, wherein said at least one strap comprises a pair of straps, symmetrically identical and symmetrically arranged with respect to the middle line of the handlebar rod.

7. The assembly according to claim 6, wherein at least the central portion of the straps has a tapered cross section, with thickness that reduces towards one side of the strap, facing the opposite way with respect to the middle line of the handlebar rod.

8. The assembly according to claim 1, wherein the seats formed in the handlebar attachment are open on one side of the handlebar attachment.

9. The assembly according to claim 1, wherein the handlebar attachment is made from composite material and the strap is made from metal, and wherein metal bushes are provided incorporated in the handlebar attachment for the coupling of the attachment screws of the strap to the handlebar attachment.

10. The assembly according to claim 9, wherein the central portion of the strap is arranged circumferentially around the handlebar rod for a contact angle (β) comprised between 170° and 225°.

11. The assembly according to claim 9, wherein the strap is made from aluminum.

12. The assembly according to claim 1, wherein the seats formed in the handlebar attachment are open on one side of the handlebar attachment.

13. An attachment stop for attaching a handlebar rod to a handlebar attachment for a bicycle handlebar assembly, the attachment stop comprises at least one open strap, with a central portion intended to be arranged in the circumferential direction around the handlebar rod and two rear arms that extend tangentially from the central portion and toward each other for attaching to the handlebar attachment, and each rear arm including recesses that are of sufficient depth to receive an attachment screw within a respective recess, such that the at least one strap and heads of the attachment screw within said at least one strap do not protrude from an outline shape of the at least one strap as seen from a front of a bicycle according to a longitudinal axis of the handlebar attachment.

14. The attachment stop according to claim 13, wherein at least the central portion of the strap has a tapered cross section, with a thickness that reduces towards one side of the strap.

15. The attachment stop according to claim 13, wherein free ends of the rear arms of the strap are curved inwardly.

16. The attachment stop according to claim 14, wherein free ends of the rear arms of the strap are curved inwardly.

* * * * *